United States Patent [19]
Nguyen

[11] Patent Number: 5,923,545
[45] Date of Patent: Jul. 13, 1999

[54] METHOD AND APPARATUS FOR PROVIDING MULTIPLE OUTPUT VOLTAGES FROM A VOLTAGE REGULATOR

[75] Inventor: Don J. Nguyen, Portland, Oreg.

[73] Assignee: Intel Corporation, Santa Clara, Calif.

[21] Appl. No.: 09/081,485

[22] Filed: May 18, 1998

[51] Int. Cl.[6] .................................................. H02M 3/335
[52] U.S. Cl. ............................................................. 363/24
[58] Field of Search .................................. 363/16, 17, 24, 363/25, 98, 132; 323/355, 363

[56] References Cited

U.S. PATENT DOCUMENTS 5,500,791  3/1996  Kheraluwala et al. .................... 363/17
5,654,881  8/1997  Albrech et al. ............................ 363/25

*Primary Examiner*—Matthew Nguyen
*Attorney, Agent, or Firm*—Thomas R. Lane

[57] ABSTRACT

A voltage regulator illustrating one embodiment of the apparatus of the present invention is described. The voltage regulator includes an output stage for providing a primary output voltage on a primary output terminal and a secondary output voltage on a secondary output terminal, a switch for charging the output stage, a switch for discharging the output stage, and a controller for controlling the charging and discharging of the output stage to maintain the stability of the output voltages. The output stage includes a transformer for generating the primary and secondary output voltages, a switch for regulating the secondary output voltage, and capacitors for storing charge to maintain the primary and secondary output voltages. The transformer includes a primary inductor for generating the primary output voltage and a secondary inductor for generating the secondary output voltage. Based on feedback signals from the primary and secondary output voltages terminals, the controller generates three output signals, each output signal controlling one of the three switches.

13 Claims, 4 Drawing Sheets

(PRIOR APPROACH)

METHOD AND APPARATUS FOR PROVIDING MULTIPLE OUTPUT VOLTAGES FROM A VOLTAGE REGULATOR

FIELD OF THE INVENTION

The present invention relates to the field of voltage regulators and more particularly to the field of voltage regulators with multiple outputs.

BACKGROUND OF THE INVENTION

A typical application of a voltage regulator is to provide a stable supply voltage to an integrated circuit (IC) in an electronic device, such as a microprocessor in a computer system. Some voltage regulators are used in electronic devices that include ICs that require multiple stable supply voltages. For example, a microprocessor in a computer system can have core circuitry, such as execution, cache, and decode circuitry, that requires a primary stable supply voltage, and peripheral circuitry, such as input/output buffers, that requires a secondary stable supply voltage.

One prior approach to providing multiple stable supply voltages to ICs in electronic devices is illustrated in FIG. 1. In FIG. 1, controller 101, switches 102 and 103, primary inductor 104, and primary capacitor 105 form a typical switching regulator that provides a stable primary output voltage on primary output voltage terminal 106. When the primary output voltage is below a desired potential, controller 101 causes switch 102 to close or remain closed, and causes switch 103 to open or remain open. With switch 102 closed and switch 103 open, current flows through primary inductor 104, from negative terminal 107 to positive terminal 108, to charge primary capacitor 105 and supply current to primary load 109. After the primary output voltage rises to the desired potential, controller 101 causes switch 102 to open and switch 103 to close, such that primary output terminal 106 is connected to ground through primary inductor 104. Then, the voltage induced across primary inductor 104 causes current to continue flowing in the same direction through primary inductor 104, until the primary output voltage falls below the desired potential, which causes controller 101 to close switch 102 and open switch 103.

Also in FIG. 1, transformer 110, including primary inductor 104 and secondary inductor 111, is used along with rectifying diode 111, series regulator 113, and secondary capacitor 114 to provide a stable secondary output voltage on secondary output voltage terminal 115 at a potential above that of the primary output voltage. When switch 102 opens and switch 103 closes, the voltage induced across primary inductor 104 induces a voltage across secondary inductor 111, which forward biases rectifying diode 112 and raises or maintains the input to series regulator 113 above the potential of primary output voltage terminal 106. Since the primary output voltage at which switch 102 opens and switch 103 closes is constant, the voltage induced across primary inductor 104 is a constant, and the voltage induced across secondary inductor 111 is a constant depending on the ratio of the number of turns in secondary inductor 111 to the number of turns in primary inductor 104. However, secondary load 116 on secondary output terminal 115 is variable. When the current load on secondary output terminal 115 is increased, the current and voltage drop across rectifying diode 112 increase. The voltage at the input to series regulator 113 is reduced by the increase in the voltage drop across rectifying diode 112. Thus, one problem with this prior approach is that if the current load on secondary output terminal 115 is increased above a certain point, the voltage at the input to series regulator 113 will be too low, and the secondary output voltage will fall below the desired potential.

A typical solution to this problem with is to increase the number of turns in secondary inductor 111, such that the voltage at the input to series regulator 113 is high enough above the desired secondary output voltage to compensate for a given increase in the current load on secondary output terminal 115. The number of turns in secondary inductor 111 is also typically increased to raise the voltage at the input to series regulator 113 to compensate for the voltage drop across series regulator 113. However, the inefficiency inherent in increasing the number of turns in secondary inductor 111 to raise the voltage at the input to series regulator 113 above the desired secondary output voltage results in increased power consumption.

Therefore, a novel approach to providing multiple output voltages from a voltage regulator is desired.

SUMMARY OF THE INVENTION

A voltage regulator comprising a transformer, a switch, and a controller is disclosed. The transformer includes a primary inductor configured to provide a primary output voltage and a secondary inductor configured to provide a secondary output voltage. The switch is connected between the primary and secondary inductors. The function of the controller is to control the switch based on the primary and secondary output voltages.

DETAILED DESCRIPTION OF A PREFERRED EMBODIMENT

A method and apparatus for providing multiple output voltages from a voltage regulator is described. In the following description, specific details are set forth in order to provide a thorough understanding of the present invention. It will be apparent, however, to one skilled in the art that the present invention can be practiced without regard to these specific details. In other instances, well known concepts have not been described in particular detail in order to avoid obscuring the present invention.

Figure 2:
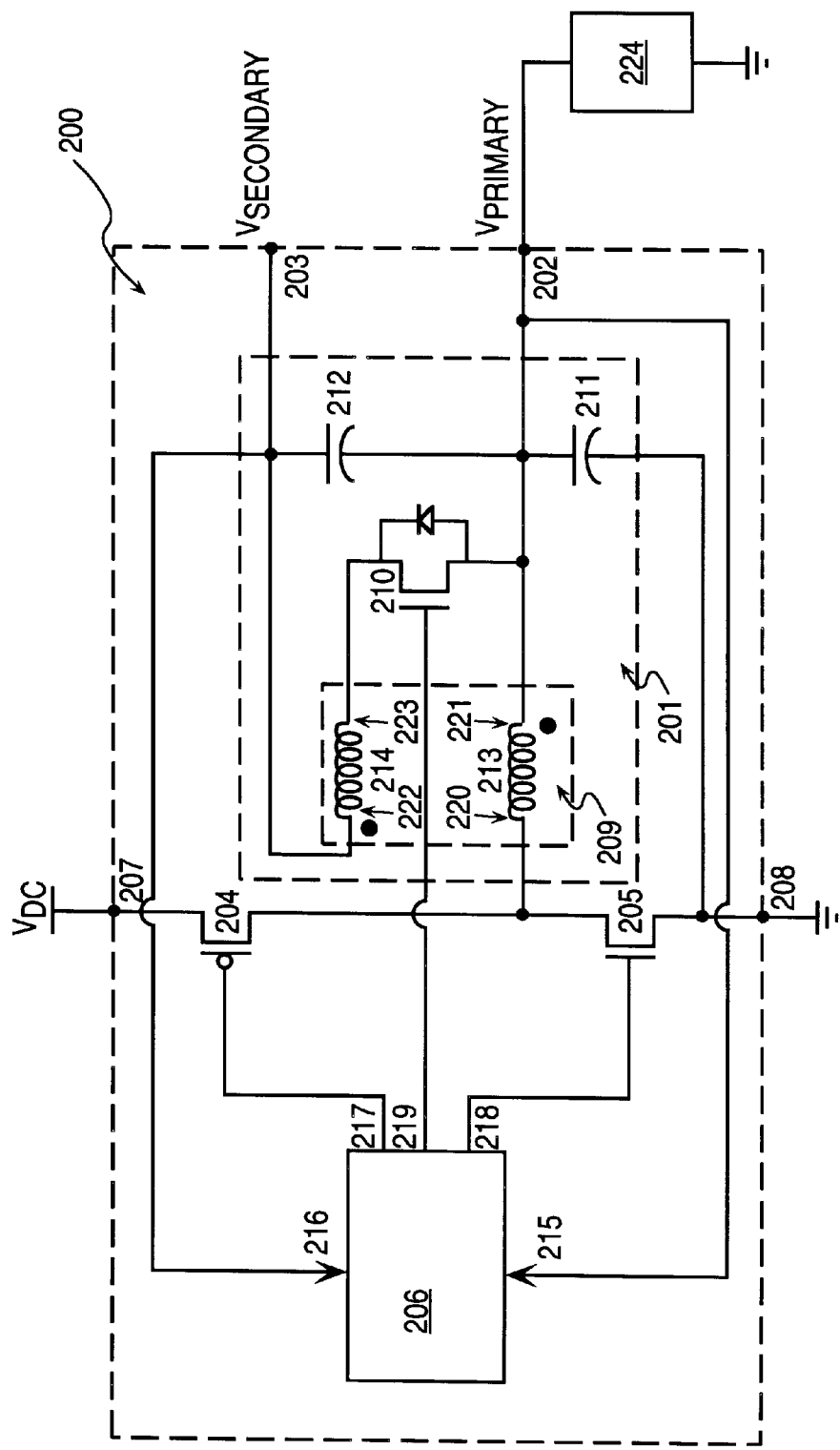
FIG. 2 is a block diagram of a voltage regulator illustrating one embodiment of the apparatus of the present invention.

One embodiment of the apparatus of the present invention is a voltage regulator providing a primary and a secondary output voltage, as illustrated in FIG. 2. In FIG. 2, voltage regulator 200 includes output stage 201 for providing a primary output voltage on output terminal 202 and a secondary output voltage on output terminal 203, switch 204 for charging output stage 201, switch 205 for discharging output stage 201, and controller 206 for controlling the charging and discharging of output stage 201 to maintain the stability of the output voltages. Voltage regulator 200 also includes first input voltage terminal 207, connected to DC voltage source $V_{DC}$ in this embodiment, and second input voltage terminal 208, connected to ground in this embodiment. Terminals 202, 203, 207, and 208 can comprise any electrical connector, such as but not limited to a pin, pad, or solder bump.

In voltage regulator 200, output stage 201 includes transformer 209 for generating the primary and secondary output voltages, switch 210 for regulating the secondary output voltage, and capacitors 211 and 212 for storing charge to maintain the primary and secondary output voltages, respectively. Transformer 209 includes primary inductor 213 for generating the primary output voltage and secondary inductor 214 for generating the secondary output voltage.

Figure 1:
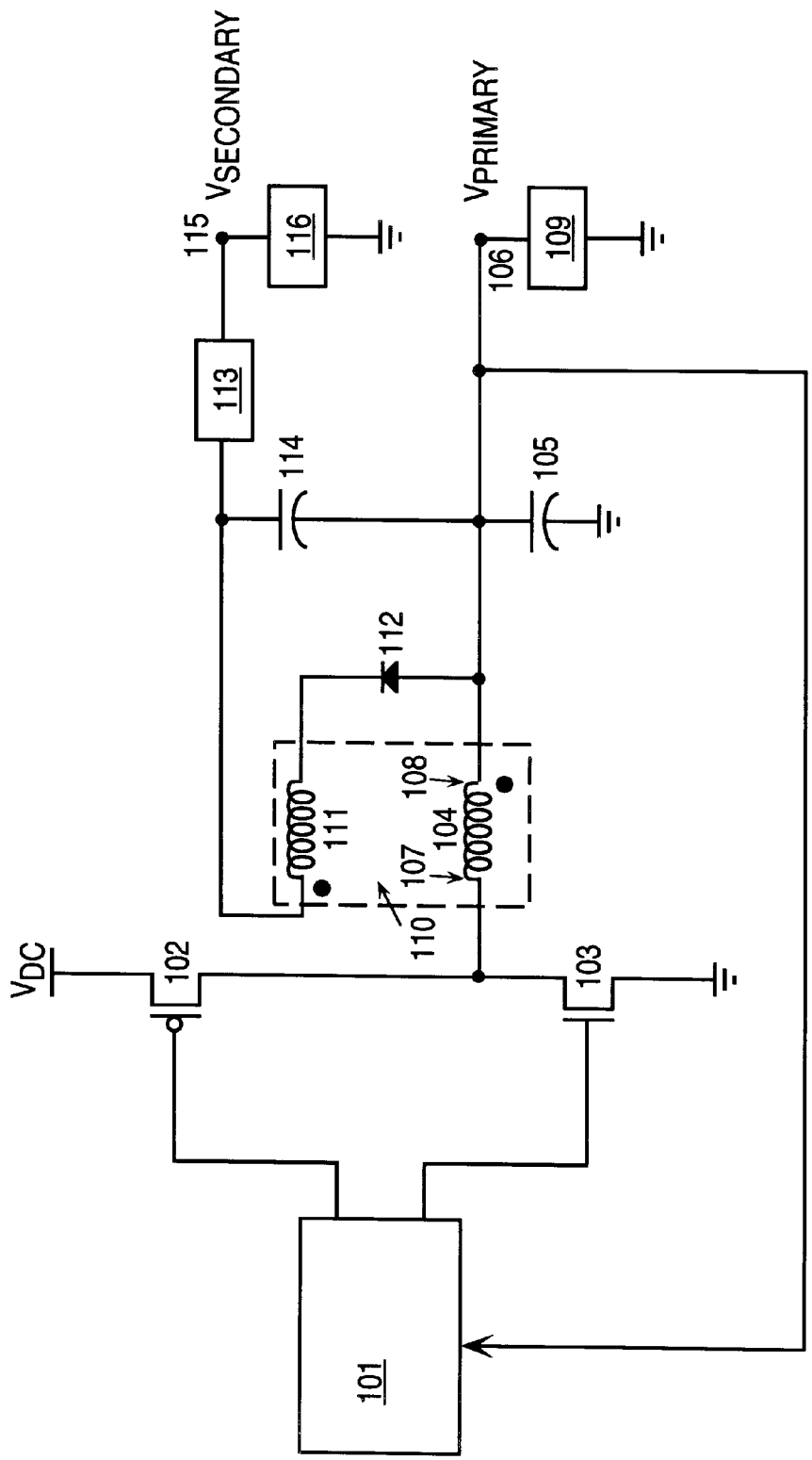
FIG. 1 is a block diagram illustrating a prior approach to providing multiple stable supply voltages to an IC in an electronic device.

Controller 206 receives two input signals, the primary output voltage on signal line 215 and the secondary output voltage on signal line 216. Controller 206 generates three output signals based on the two input signals. The three output signals are a signal on signal line 217 to control switch 204, a signal on signal line 218 to control switch 205, and a signal on signal line 219 to control switch 210. In the embodiment of FIG. 1, switch 204 is a P channel metal-oxide-semiconductor field effect transistor (PMOS FET) and switches 205 and 210 are N channel metal-oxide-semiconductor field effect transistors (NMOS FETs). However, switches 204, 205, and 210 can be any type of switch, such a PMOS FETs, NMOS FETs, junction FETs, or bipolar transistors. In the embodiment of FIG. 1, the signal on signal line 217 is an active low signal and is asserted to close switch 204, and the signals on signal lines 218 and 219 are active high signals and are asserted to close switches 205 and 210, respectively.

Controller 206 controls switches 204 and 205 in order to maintain the stability of the primary output voltage. For example, when the primary output voltage is below a desired potential, controller 206 causes switch 204 to close or remain closed such that primary output terminal 202 is connected to $V_{DC}$ through primary inductor 213, and causes switch 205 to open or remain open. With switch 204 closed and switch 205 open, current flows through primary inductor 213, from negative terminal 220 to positive terminal 221, to charge primary capacitor 211 and supply current to primary load 224. After the primary output voltage rises to the desired potential, controller 206 causes switch 204 to open and switch 205 to close, such that primary output terminal 202 is connected to ground through primary inductor 213. Then, the potential difference induced across primary inductor 213 causes current to continue flowing in the same direction through primary inductor 213, until the primary output voltage falls below the desired potential, which causes controller 206 to open switch 205 and close switch 204.

Controller 206 also controls switch 210 to maintain the stability of the secondary output voltage. The secondary output voltage is charged to a value above the primary output voltage by the operation of transformer 207. When switch 204 opens and switch 205 closes, the potential difference induced across primary inductor 213 induces a positive potential difference across secondary inductor 214. The positive potential difference induced across secondary inductor 214 is used to raise the secondary output voltage as needed, by the operation of switch 210 under the control of controller 206. In one embodiment, controller 206 causes switch 210 to close or remain closed to use the positive potential difference induced across secondary inductor 214 to raise the secondary output voltage, and controller 206 causes switch 210 to open or remain open if the secondary output voltage does not need to be raised. For explanatory purposes, assume that in this embodiment there can be an unlimited voltage drop across switch 210 when it is open but there is no voltage drop across switch 210 when it is closed. Then, when the secondary output voltage is not below the desired potential, switch 210 will open or remain open, such that the positive potential difference induced across secondary inductor 214 will be dropped across switch 210 and the potential at positive terminal 221 of secondary inductor 214 will not be raised. However, when the secondary output voltage is below the desired potential, switch 210 will close or remain closed, such that the potential at positive terminal 222 of secondary inductor 214 will be raised above that of positive 221 terminal of primary inductor 213 by the amount of the positive potential difference induced across secondary inductor 214. The number of turns in secondary inductor 214 relative to the number of turns in primary inductor 213 is chosen such that the potential at positive terminal 222 of secondary inductor 214 can be raised at least as high as the desired secondary output voltage.

To illustrate the preceding description of the operation of transformer 207, consider an embodiment in which the desired primary output voltage is 1.8V, the desired secondary output voltage is 2.5V, the number of turns in primary inductor 213 is eighteen, and the number of turns in secondary inductor is nine. After switch 204 opens and switch 205 closes, the potential difference of 1.8V across primary inductor 213 induces a potential difference of 0.9V across secondary inductor 214, assuming perfect efficiency of transformer 207. If the secondary output voltage is lower than 2.5V, switch 210 is closed or remains closed, such that the potential at positive terminal 222 of secondary inductor 214 is raised to 2.7V, resulting in the addition of charge to secondary capacitor 212 and an increase in the secondary output voltage. If, instead, the secondary output voltage is at least 2.5V, switch 210 is opened or remains open, such that the potential at positive terminal 222 of secondary inductor 214 is not raised above 2.5V.

In the embodiment of FIG. 2, switch 210 is a MOSFET. One advantage of using a MOSFET as switch 210 is that in comparison to the forward voltage drop across rectifying diode 110 in FIG. 1, there can be a lower and more stable voltage drop across a conducting MOSFET having a low channel resistance. An N channel MOSFET can be used to provide a lower channel resistance than a P channel MOSFET of the same size.

In the embodiment of FIG. 2, MOSFET switch 210 is turned or left on only to raise the secondary output voltage when a positive potential difference is induced across secondary inductor 214 and the secondary output voltage is below the desired potential. Then, the potential at positive terminal 222 of secondary inductor 214 will be raised above that of positive terminal 221 of primary inductor 213 by the amount of the positive potential difference induced across secondary inductor 214 minus the voltage drop across conducting MOSFET switch 210. The number of turns in secondary inductor 214 relative to the number of turns in primary inductor 213 is chosen such that the potential at positive terminal 222 of secondary inductor 214 can be raised at least as high as the desired secondary output voltage, taking into account the voltage drop across conducting MOSFET switch 210.

In the embodiment of FIG. 2, when a positive potential difference is induced across secondary inductor 214 but the secondary output voltage is not below the desired potential, MOSFET switch 210 is turned or left off. However, the positive potential difference induced across secondary inductor 214 forward biases the intrinsic body diode of the MOSFET. Then, the potential at positive terminal 222 of secondary inductor 214 cannot be raised above that of positive terminal 221 of primary inductor 213 by more than the positive potential difference induced across secondary inductor 214 minus the forward voltage drop of the intrinsic body diode of MOSFET switch 210. MOSFET switch 210 is designed such that the forward voltage drop of the intrinsic body diode of MOSFET switch 210 is greater than the voltage drop across MOSFET switch 210 when MOSFET switch 210 is conducting in the region in which it operates in this embodiment, therefore, the potential at positive terminal 222 of secondary inductor 214 cannot be raised above the potential of positive terminal 222 when MOSFET switch 210 is turned on. The number of turns in secondary inductor 214 relative to the number of turns in primary inductor 213 can be chosen such that the potential at positive terminal 222 of secondary inductor 214 is not raised above the desired secondary output voltage when MOSFET switch 210 is off.

In an alternative embodiment, switch 210 comprises two N channel MOSFETs. Then, under the operating conditions described in the previous paragraph, the intrinsic body diodes of the two N channel MOSFETs are in a back to back configuration such that neither of these diodes becomes forward biased.

To illustrate the description of the operation of transformer 207 when switch 210 is a MOSFET, consider an embodiment in which the desired primary output voltage is 1.8V, the desired secondary output voltage is 2.5V, the number of turns in primary inductor 213 is eighteen, the number of turns in secondary inductor 214 is nine, the voltage drop across conducting MOSFET switch 210 is at most 0.2V, and the forward voltage across the intrinsic body diode of MOSFET switch 210 is at least 0.5V. When switch 204 opens and switch 205 closes, the 1.8V across primary inductor 213 induces a voltage of 0.9V across secondary inductor 214, assuming perfect efficiency of transformer 207. If the secondary output voltage is lower than 2.5V, MOSFET switch 210 is turned or left on, such that the potential at positive terminal 222 of secondary inductor 214 is raised to 2.7V minus the voltage drop across conducting MOSFET switch 210, resulting in the addition of charge to secondary capacitor 212 and an increase in the secondary output voltage. If, instead, the secondary output voltage is at least 2.5V, MOSFET switch 210 is turned or left off, such that the potential at positive terminal 222 of secondary inductor 214 is not raised above 2.5V.

Various embodiments of the present invention are possible to compensate for less than perfect efficiency of transformer 207. In one embodiment, the voltage drop across conducting MOSFET switch 210 is reduced by decreasing the channel resistance. In another embodiment, the number of turns in secondary inductor 214 is increased.

Returning to FIG. 2, controller 206 controls switches 204, 205, and 210 based on the primary and secondary output voltages. Controller 206 can be implemented in hardware, software, or any combination of hardware and software. In one embodiment, controller 206 includes a discrete microcontroller or microprocessor. In another embodiment, controller 206 includes a primary comparator for comparing the primary output voltage to a primary reference voltage, and a secondary comparator for comparing the secondary output voltage to a secondary reference voltage. The primary and secondary reference voltages can be generated internal or external to controller 206 using any known techniques.

In one embodiment, the primary reference voltage is equal to the desired primary output voltage. The primary reference voltage is connected to one input terminal of a primary comparator, and the primary output voltage is connected to another input terminal of the primary comparator, such that the output of the primary comparator indicates whether the primary output voltage is higher or lower than the primary reference voltage. When the primary output voltage is higher than the primary reference voltage, controller 206 causes switch 204 to open or remain open, and causes switch 205 to close or remain closed. When the primary output voltage lower than the primary reference voltage, controller 206 causes switch 205 to close or remain closed, and causes switch 205 to open or remain open.

Similarly, in one embodiment, the secondary reference voltage is equal to the desired secondary output voltage. The secondary reference voltage is connected to one input terminal of a secondary comparator, and the secondary output voltage is connected to another input terminal of the secondary comparator, such that the output of the secondary comparator indicates whether the secondary output voltage is higher or lower than the secondary reference voltage. The output of the secondary comparator is connected to the output of the primary comparator such that controller 206 causes switch 210 to close or remain closed when the primary output voltage is higher than the primary reference voltage and the secondary output voltage is below the secondary reference voltage. When the primary output voltage is lower than the primary reference voltage or the secondary output voltage is higher than the secondary output voltage, controller 206 causes switch 210 to open or remain open.

Figure 3:
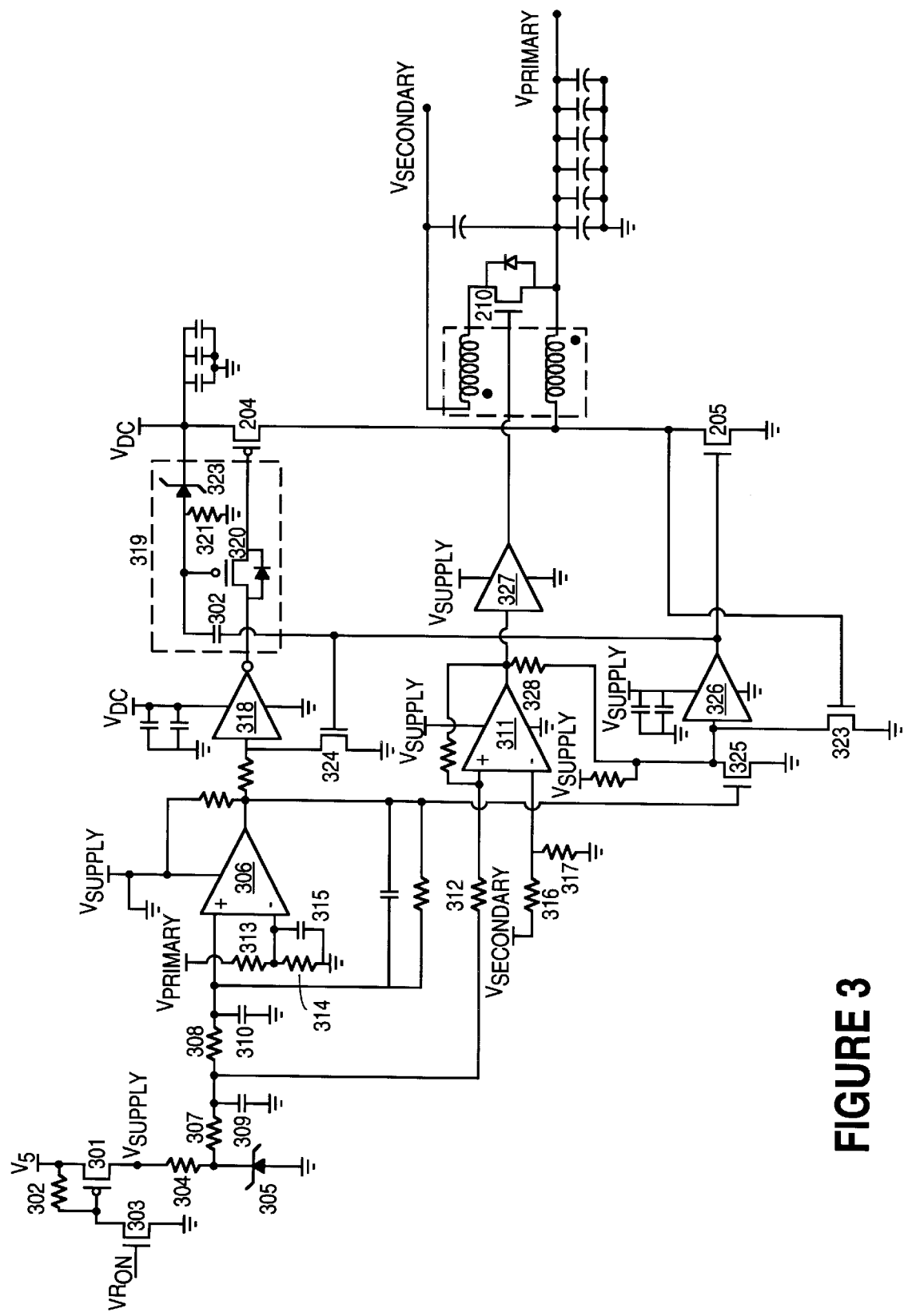
FIG. 3 is a circuit diagram illustrating one embodiment of the present invention.

FIG. 3 is a circuit diagram illustrating one embodiment of the present invention. In FIG. 3, 5V voltage source $V_5$ is connected to the source of transistor 301. Resistor 302 is connected between the source and gate of transistor 301. The gate of transistor 301 is also connected to the drain of transistor 303. The source of transistor 303 is connected to ground, and the gate of transistor 303 is connected to a signal $VR_{ON}$, which, when asserted, causes the generation of supply voltage $V_{supply}$ at the drain of transistor 301.

Supply voltage $V_{supply}$ is connected to one terminal of resistor 304. The cathode of voltage reference diode 305 is connected to the other terminal of resistor 304 and the anode of voltage reference diode 305 is connected to ground, resulting in a predetermined reference voltage at the cathode of voltage reference diode 305. In this embodiment, voltage reference diode 305 is an LM4041 zener diode.

The cathode of voltage reference diode 305 is also connected to the positive input terminal of primary comparator 306 through a time delay circuit including resistors 307 and 308 and capacitors 309 and 310, and to the positive input terminal of secondary comparator 311 through resistor 312 and a time delay circuit including resistor 307 and capacitor 309. The primary output voltage is connected to the negative input terminal of primary comparator 306 through a voltage divider including resistors 313 and 314 and capacitor 315. The secondary output voltage is connected to the negative input terminal of secondary comparator 311 through a voltage divider including resistors 316 and 317. In this embodiment, primary and secondary comparators 306 and 311 are LM339 quad comparators powered by supply voltage $V_{supply}$.

The output of primary comparator 306 is connected to the input of inverting driver 318. The output of inverting driver 318 is connected to the input of level shifter 319 which includes transistor 320, resistor 321, capacitor 322, and zener diode 323. Level shifter 319 is used to control the gate to source voltage of the P channel MOSFET switch 204. The output of level shifter 319 controls switch 204. The input of inverting driver 318 is also connected to the drain of safety transistor 324, whose gate is connected to the gate of switch 205 such that switch 204 does not close unless switch 205 is open. In this embodiment, inverting driver 318 is a TC4431 inverting CMOS driver powered by voltage source $V_{DC}$.

The output of primary comparator 306 is also connected to the gate of transistor 325. The drain of transistor 325 is connected to the input of noninverting driver 326. The output of noninverting driver 326 controls switch 205. The input of noninverting driver 326 is also connected to the drain of safety transistor 327, whose gate is connected to the drain of switch 204 such that switch 205 does not close unless switch 204 is open. In this embodiment, noninverting driver 326 is a TC4412 noninverting CMOS driver powered by supply voltage $V_{supply}$.

The output of secondary comparator 311 is connected to the input of noninverting driver 327. The output of noninverting driver 327 controls switch 210. The input of noninverting driver 327 is also connected to the drain of transistor 325 through resistor 328, such that switch 210 does not close unless switch 205 is closed. In this embodiment, noninverting driver 327 is a TC4427 noninverting CMOS driver powered by supply voltage $V_{supply}$.

Figure 4:
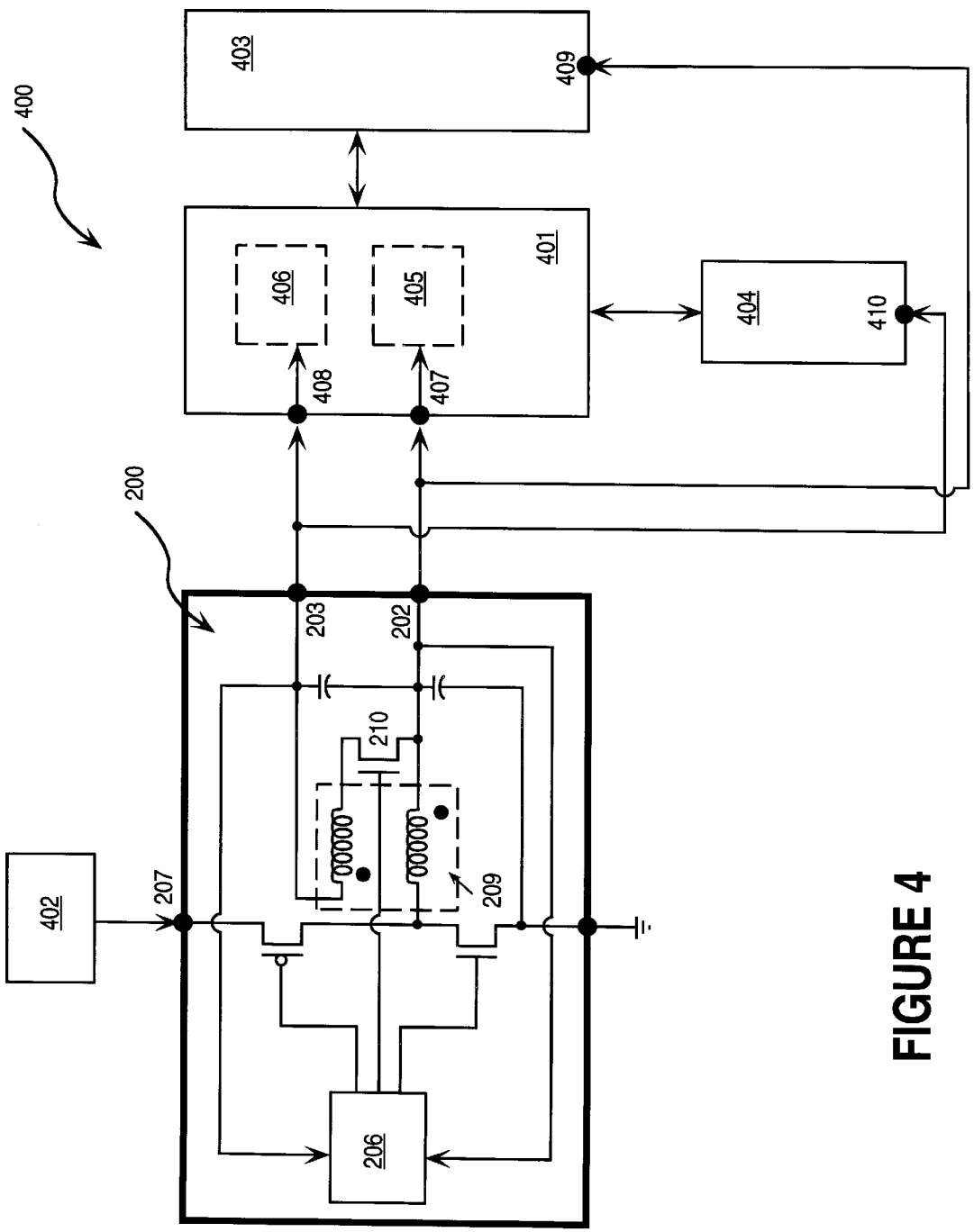
FIG. 4 is a block diagram illustrating one embodiment of the present invention in a computer system.

FIG. 4 is a block diagram illustrating one embodiment of the apparatus of the present invention in a computer system 400. Computer system 400 includes voltage regulator 200 and processor 401. Computer system 400 can also include other components, such as DC voltage source 402, memory 403, and input/output (I/O) device 404. Voltage regulator 200 includes primary output voltage terminal 202, secondary output terminal 203, transformer 209, switch 210, and controller 206 as described above. Voltage regulator 201 also includes input voltage terminal 207 which is connected to DC voltage source 402.

Processor 401 in computer system 400 includes core circuitry 405, such as but not limited to execution, cache, and decode circuitry, that requires a primary stable supply voltage, and peripheral circuitry 406, such as but not limited to input/output buffers, that requires a secondary stable supply voltage. Power is supplied to core circuitry 405 through core voltage input terminal 407, and power is supplied to peripheral circuitry 406 through peripheral voltage input terminal 408. Input terminals 407 and 408 can comprise any electrical connector, such but not limited to a pin, pad, or solder bump. Core voltage input terminal 407 of processor 401 is connected to primary output terminal 202 of voltage regulator 200, and peripheral voltage input terminal 408 is connected to secondary output terminal 203 of voltage regulator 200. Thus, a stable primary supply voltage is supplied to core circuitry 401 by voltage regulator 200, and a stable secondary supply voltage is supplied to peripheral circuitry 402 by voltage regulator 200. In one embodiment, the primary stable supply voltage is approximately 1.8V and the secondary stable supply voltage is approximately 2.5V.

Although not required by the present invention, the computer system of FIG. 4 also includes memory 403, which in this embodiment requires a stable supply voltage equal to the primary output voltage of voltage regulator 200, and I/O device 404, which in this embodiment requires a stable supply voltage equal to the secondary output voltage of voltage regulator 200. Therefore, memory 403 includes voltage input terminal 409, which is connected to primary output voltage terminal 202 of voltage regulator 200, and I/O device 404 includes voltage input terminal 410, which is connected to secondary output voltage terminal 203 of voltage regulator 200. Other embodiments wherein voltage regulator 200 provides one or more stable supply voltages to any number of other components are also possible.

Thus, the exemplary embodiments of the present invention illustrated by FIGS. 2, 3, and 4 have been described. However, the invention is not limited to these embodiments or any of the details described. The specification and drawings must be regarded in an illustrative rather than a restrictive sense. The scope of the invention is defined by the following claims.

What is claimed is:

1. A voltage regulator comprising:
   a transformer having a primary inductor and a secondary inductor, said primary inductor configured to provide a primary output voltage and said secondary inductor configured to provide a secondary output voltage;
   a switch connected between said primary and said secondary inductors; and
   a controller for controlling said switch based on said primary and said secondary output voltages.

2. The voltage regulator of claim 1 wherein said controller closes said switch when said primary output voltage is at least as high as a primary reference voltage and said secondary output voltage is lower than a secondary reference voltage.

3. The voltage regulator of claim 2 wherein said controller comprises:
   a primary comparator for comparing said primary output voltage to said primary reference voltage; and
   a secondary comparator for comparing said secondary output voltage to said secondary reference voltage.

4. The voltage regulator of claim 1 wherein a potential difference induced across said secondary inductor when said switch closes causes an increase in said secondary output voltage.

5. The voltage regulator of claim 1 wherein said switch comprises a field effect transistor.

6. A voltage regulator comprising:
   a transformer comprising a primary inductor and a secondary inductor;
   a primary output voltage terminal for providing a primary output voltage, said primary output voltage terminal being connected to the positive terminal of said primary inductor;
   a secondary output voltage terminal for providing a secondary output voltage, said secondary output voltage terminal being connected to the positive terminal of said secondary inductor;
   a first switch connected between the positive terminal of said primary inductor and the negative terminal of said secondary inductor;
   a first input voltage terminal;
   a second switch connected between said first input voltage terminal and the negative terminal of said primary inductor;
   a second input voltage terminal;
   a third switch connected between said second input voltage terminal and the negative terminal of said primary inductor; and
   a controller for controlling said first, second, and third switches based on said primary and said secondary output voltages.

7. The voltage regulator of claim 6 wherein a potential difference induced across said primary inductor when said third switch closes induces a potential difference across said secondary inductor when said first switch closes, said potential difference across said secondary inductor causing an increase in said secondary output voltage.

8. An electronic system comprising:
   a first electronic device having a first input voltage terminal for receiving a first supply voltage;
   a second electronic device having a second input voltage terminal for receiving a second supply voltage; and
   a voltage regulator comprising:
      a primary output voltage terminal being connected to said first input voltage terminal for providing said first supply voltage;
      a secondary output voltage terminal being connected to said second input voltage terminal for providing said second supply voltage;
      a transformer comprising a primary inductor connected to said primary output voltage terminal and a secondary inductor connected to said secondary output voltage terminal;
      a switch connected between said primary and said secondary inductors; and
      a controller for controlling said switch based on said first and second supply voltages.

9. A computer system comprising:
   a voltage regulator comprising:
      a primary output voltage terminal for providing a primary output voltage;
      a secondary output voltage terminal for providing a secondary output voltage;
      a transformer comprising a primary inductor connected to said primary output voltage terminal and a secondary inductor connected to said secondary output voltage terminal;
      a switch connected between said primary and said secondary inductors; and
      a controller for controlling said switch based on said primary and said secondary output voltages; and
   an electronic device comprising:
      a first circuit;
      a second circuit;
      a first voltage input terminal for supplying power to said first circuit, said first voltage input terminal being connected to said primary output voltage terminal of said voltage regulator; and
      a second voltage input terminal for supplying power to said second circuit, said second voltage input terminal being connected to said second output voltage terminal of said voltage regulator.

10. The computer system of claim 9 wherein said electronic device comprises a processor.

11. The computer system of claim 10 wherein said first circuit comprises core circuitry and said second circuit comprises peripheral circuitry.

12. A method of providing a secondary output voltage from a voltage regulator, said method comprising:
   generating a control signal based on a primary output voltage and said secondary output voltage;
   selectively connecting a primary inductor of a transformer and a secondary inductor of said transformer based on said control signal, said primary inductor configured to provide said primary output voltage and said secondary inductor configured to provide said secondary output voltage.

13. The method of claim 12 wherein:
   the step of generating said control signal includes steps of:
      comparing said primary output voltage to a primary reference voltage and said secondary output voltage to a secondary reference voltage; and
      asserting said control signal when said primary output voltage is at least as high as said primary reference voltage and said secondary output voltage is lower than said secondary reference voltage; and
   the step of selectively connecting said primary and said secondary inductors includes a step of connecting said primary and said secondary inductors when said control signal is asserted.

* * * * *